Sept. 14, 1948. E. L. SARGENT 2,449,253
PREPARATION OF HOLLOW GEL SPHEROIDS
Filed June 23, 1945
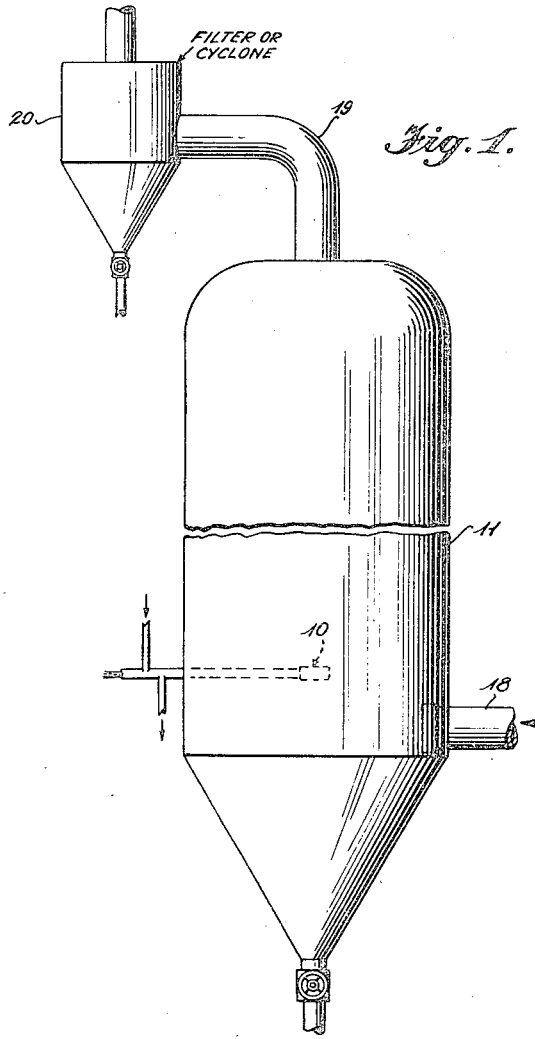
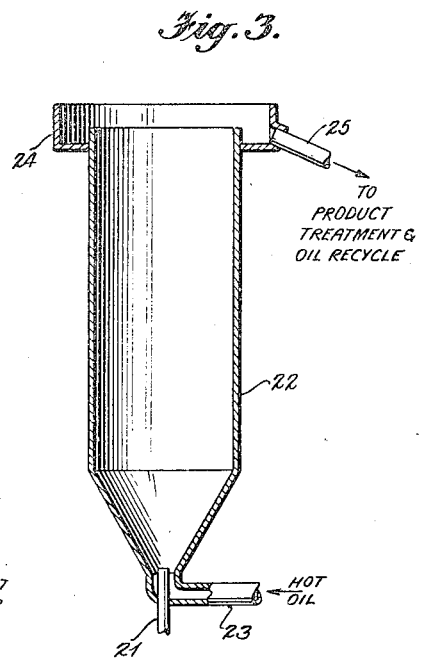
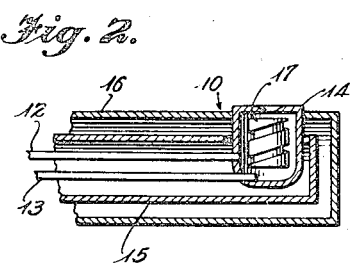
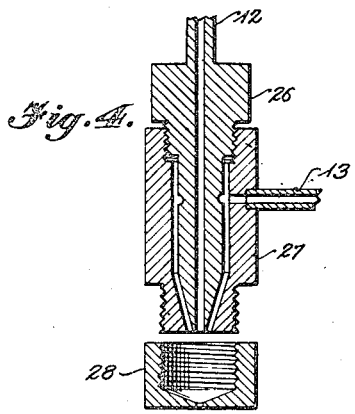
INVENTOR
Edmund L. Sargent
BY
Oswald G. Hayes
ATTORNEY Patented Sept. 14, 1948

2,449,253

UNITED STATES PATENT OFFICE 2,449,253

PREPARATION OF HOLLOW GEL SPHEROIDS

Edmund L. Sargent, Woodbury, N. J., assignor to Socony-Vacuum Oil Company, Incorporated, a corporation of New York Application June 23, 1945, Serial No. 601,312

9 Claims. (Cl. 252—317)

1

This invention relates to hollow spheroids having walls of gel formed by drying of the corresponding hydrogels and to the process of making the same. The products of this invention are extremely light and are useful as light weight fillers for various purposes and as heat insulation.

Gels are well known to the art and gels of silica have been manufactured on a large scale for use as adsorbents, catalysts and the like. Silica-alumina gels and other plural oxide gels have been widely used in the partially dried state as zeolytic water softeners and in the dried state at catalysts. The forms in which the gels are marketed have varied consideraby to adapt them to desired purposes and have varied from the broken particles of silica gel used for many years to powders and molded pellets. Apparent density, i. e., weight per unit volume of a mass of the dried particles may vary from greater than one gram per cc. to less than 0.5 gram/cc. depending on the method of preparation. The so-called aerogels, made by the process of Kistler Patent No. 2,093,454 may have even lower apparent densities as low as 0.03 gram per cc.

The present invention contemplates the manufacture of particles of gel having an apparent density on the order of that of aerogel, but which have improved properties for uses to which very light weight gels are adapted. The Kistler process involves preparation of a hydrogel which is then immersed several times in a liquid having a relatively low critical temperature (e. g. ethyl alcohol) to replace the aqueous phase by such liquid. The gel, such as an alcogel, is then placed in an autoclave and heated to the critical temperature of such liquid while maintaining a pressure at last equal to the vapor pressure of the liquid phase of the gel. The liquid is allowed to vaporize at the critical temperature, thus leaving an unshrunk dried gel of very low apparent density. However, the product is in the form of irregular fragments of very low mechanical strength and is otherwise subject to deterioration in use.

According to my present invention, gel bodies having the same apparent density as aerogels, or even less, are formed as hollow spheroids which, because of their smooth hard surfaces and rounded shape, have much higher mechanical strength than aerogels. The present products can be crushed under moderate pressures but the smooth surfaces consisting of smooth curves render them highly resistant to other types of breakage, such as attrition. Another important advantage of the present product is its stability, it

2 being possible to wet it with water without adverse effect.

It is an essential element of my invention that a true hydrogel be formed. The term gel has heretofore been loosely used in the art as a generic term including both true gels and gelatinous precipitates. The latter are formless masses of no rigidity or strength and are not adapted to use in my invention. The true hydrogel characteristically forms from a clear hydrosol substantially free of gelatinous precipitates. The time of setting to a hydrogel is a function of temperature, pH and concentration. Any given gelable hydrosol will pass through a typical gelation at constant temperature. As the time for setting to a firm gel expires, the sol becomes more viscous and finally becomes rigid. This rigid state characterizes gelation and at this point, the gel may be broken like a solid and will not again flow together as will the sol. The gel continues to harden after gelation takes place and shrinks slightly with exudation of water, known as syneresis.

The present process takes advantage of the viscous state existing just prior to gelation by causing evaporation of water at this point, expanding the sol to a hollow bubble having a shell which gels to form a rigid hollow spheroid. The gel is then dried in this form to yield particles having thin, but hard, spheroidal walls enclosing a dead air space of high utility for heat insulation and the like. The said purpose is accomplished by spraying a sol in the viscous state and at a temperature above its boiling point into a gas atmosphere at a temperature above the boiling point of the sol. Alternatively, the sol may be sprayed into a body of liquid at such elevated temperature. In any event, the temperature of the fluid into which the sol is sprayed is such as to aid in vaporization of the water content of the gel, at least to substantial dryness. It is not necessary to remove the few percent of water that is normally strongly held by a gel but only to evaporate that portion of water which is readily evolved at the temperature of formation of the hollow spheroids. In some cases it may be found desirable to retain considerable water in the gel, for example formation and drying may be at a temperature only a few degrees above the boiling point. Zeolytic sodium cannot be removed by base exchange if the gel is substantially completely dried and it may be preferable to retain in the gel enough water to permit zeolytic removal of sodium by base exchange, as with aqueous ammonium or metal salt solutions.

Additional objects and advantages of my invention will appear from more detailed discussion below of specific embodiment thereof; apparatus for practice of the invention being shown in the annexed drawings, wherein:

Figure 1 is an elevation of apparatus for forming the product of my invention by spraying a gelable sol into a heated gas;

Figure 2 is a detail view of a suitable nozzle mixer;

Figure 3 is a sectional view of apparatus employing a liquid forming medium, and Figure 4 is a detail section of a further type of nozzle.

Referring specifically to Figure 1, a gelable sol is prepared by rapid mixing of two or more reactant solutions in a mixing nozzle 10 and immediately sprayed into a heated atmosphere in a tower 11. The sol may, if desired, be prepared at a remote point and conducted while heating to the nozzle. Since the sol should be almost at the gelation stage at the time of spraying, this involves difficulties due to gelation in the line and it is greatly preferred that the sol be mixed at the spray point. The reactant solutions are heated to the desired temperature, above the boiling point under the pressure of the tower, in the supply lines while maintained under sufficient pressure to maintain the liquid phase and the concentration of the reactant solutions is such that immediate thickening occurs. The spray is therefore a viscous sol of very short gelation time, say a fraction of a second, containing substantially no gelatinous precipitate, and at a temperature above its boiling point under tower pressure. Upon being sprayed into the tower, water flashes to steam inside the droplets expanding them to bubbles and at the same time gelation occurs forming a rigid shell.

The detailed section of Figure 2 illustrates a mixing nozzle by which this desired purpose may be achieved. Supply lines 12 and 13 for reactant solutions lead to a mixing chamber 14 through a heat exchanger made up of an inner tube 15 and an outer tube 16. A heat exchange medium, such as a gas oil is circulated in through tube 15 and discharged through tube 16 to preheat the reactant solutions and maintain them and the sol at a desired temperature. A core 17 having a helical groove reduces the volume of the mixing chamber and aids in obtaining rapid thorough mixing. An advantageous modification of the mixing nozzle is to replace the upper surface thereof with a rubber, or other resilient, diaphragm having a small orifice. Such a diaphragm will flex if the orifice becomes clogged and eject solid matter, thus restoring its efficiency.

The sol is sprayed as aforesaid into a heated atmosphere in the tower 11 to form the novel product of the invention. Heated air is supplied by conduit 18, and in the embodiment shown, the introduction of air is tangential to the tower thus providing a current swirling about the walls and entraining all gel formed from the spray. The current of air carrying the product passes out the top of the tower by conduit 19 to a separating device 20. If a fairly heavy product is made, a cyclone separator may be used, but the product will usually require a filter, such as bags of woven glass fibers. Treating gases may be introduced with the heated air, for example, ammonia, which tends to hasten gelation. A more important function of ammonia gas is to enter the gel structure before complete drying and, by base exchange with sodium, render the latter more readily removed from the gel.

Figure 3 illustrates apparatus for practice of the present invention using a liquid medium for formation of the product. Viscous sol, almost at the point of gelation and at a temperature above its boiling point under the pressure in the forming zone, is injected from a nozzle 21 into a body of liquid at a temperature above the said boiling point in a forming tower 22. Hot liquid is supplied by pipe 23 at a rate to sustain the desired temperature and liquid overflows the top of the tower into a trough 24, from which it and the inflated gel flow by pipe 25 to suitable equipment for separating oil to be recycled through a heating stage and processing the product in any desired manner. Due to the greater heat carrying capacity of the liquid medium and its greater viscosity, it is possible to form larger particles in a liquid medium. The nozzle need not have the spraying effectiveness of that shown in Figure 2, although a modification thereof having the orifice in the end of the tube is preferred.

The nozzle of Figure 4 comprises a body member 27 and an insert 26 which cooperate to supply the two reactant solutions as annular streams at the tip. An adapter 28 is provided to form a mixing chamber about said tip.

In a typical operation according to the invention, two solutions were prepared; namely an acid solution containing 3.5% sulfuric acid (100% concentration), 7.9% commercial iron-free aluminum sulfate ($Al_2(SO_4)_3.15H_2O$) and 88.6% distilled water, and a dilute water glass prepared by mixing 44.7% distilled water with 55.3% "N" Brand sodium silicate (28.7% $SiO_2$, 8.9% $Na_2O$). When these two solutions are mixed in the ratio of 137 volumes of acid solution to 150 volumes of water-glass, there is formed a clear gelable hydrosol which sets in less than one second to a firm hydrogel containing 10 grams of silica and alumina per hundred grams of gel.

The two solutions described above were supplied by positive displacement pumps at the rates of 137 cc./min. of acid and 150 cc./min. of water glass through tubes heated by hot gas oil. The mixing nozzle and the sol formed therein had a temperature of 290° F. The sol was in a viscous state and was sprayed into a vertical tower 3 feet in diameter and 14 feet high. An air current, produced by a blower, delivering 1500 cubic feet per minute, passed into the tower tangentially, forming a spiral current along the tower walls to the stack. The product was collected from the stack exhaust in glass cloth filter bags.

The hollow spheroids so obtained were carefully washed with water to remove water soluble salts, base exchanged with aluminum sulfate solution to replace zeolytic sodium and dried slowly at about 250 to 300° F. The dried material was then heat treated at 1100° F. The final product was found to be small hollow spheres which had smooth, glossy surfaces. Under the microscope the form of the spheres was clearly apparent and upon crushing, it was seen that the walls were extremely thin, bearing a relationship to the volume of the spheres on the order of that of an ordinary incandescent light bulb. Except for size, the crushed spheres were substantially identical in appearance with a broken light bulb. The spheroids in mass were found to have an apparent density of 0.029 gram per cc. and a very low coefficient of thermal conductivity. The activity of the gel as a catalyst was found to be quite low when tested for cracking of gas oil to gasoline at 800° F. as compared with the same gel prepared by base exchanging solid gel before drying to the extent (98.3%) occurring in the tower disclosed above.

Although the specific examples given relate to silica-alumina gels, the invention is also applicable to gels of other inorganic oxides such as silica, beryllia, thoria, zirconia, alumina and any combination of two or more oxides. All these substances are characterized by formation of viscous sols just prior to gelation and are therefore adapted to the invention.

I claim:

1. A process for the manufacture of hollow inorganic oxide gel spheroids which comprises forming a hydrosol of inorganic oxide having the inherent properties of setting to a hydrogel without change in chemical composition after the lapse of a period of time and of passing through a viscous state just prior to gelation, injecting said viscous sol at a temperature in excess of its boiling point at the pressure existing in the medium hereinafter defined and during the said viscous state as a plurality of drops into a fluid medium maintained at a temperature in excess of said boiling point and at a pressure below the vapor pressure of said sol at the time of injection as aforesaid; whereby the water content of said hydrosol is vaporized, expanding the drops to hollow spheroids and gelled in that form.

2. A process for the manufacture of hollow inorganic oxide gel spheroids which comprises forming a hydrosol of inorganic oxide including silica having the inherent properties of setting to a hydrogel without change in chemical composition after the lapse of a period of time and of passing through a viscous state just prior to gelation, injecting said viscous sol at a temperature in excess of its boiling point at the pressure existing in the medium hereinafter defined and during the said viscous state as a plurality of drops into a fluid medium maintained at a temperature in excess of said boiling point and at a pressure below the vapor pressure of said sol at the time of injection as aforesaid; whereby the water content of said hydrosol is vaporized, expanding the drops to hollow spheroids and gelled in that form.

3. A process for the manufacture of hollow inorganic oxide gel spheroids which comprises forming a hydrosol of inorganic oxide including silica and alumina having the inherent properties of setting to a hydrogel without change in chemical composition after the lapse of a period of time and of passing through a viscous state just prior to gelation, injecting said viscous sol at a temperature in excess of its boiling point at the pressure existing in the medium hereinafter defined and during the said viscous state as a plurality of drops into a fluid medium maintained at a temperature in excess of said boiling point and at a pressure below the vapor pressure of said sol at the time of injection as aforesaid; whereby the water content of said hydrosol is vaporized, expanding the drops to hollow spheroids and gelled in that form.

4. A process for the manufacture of hollow inorganic oxide gel spheroids which comprises forming a hydrosol of inorganic oxide having the inherent properties of setting to a hydrogel without change in chemical composition after lapse of a period of time and of passing through a viscous state just prior to gelation, injecting said viscous sol at a temperature in excess of its boiling point at the pressure existing in the medium hereinafter defined and during the said viscous state as a plurality of drops into a liquid medium maintained at a temperature in excess of said boiling point and at a pressure below the vapor pressure of said sol at the time of injection as aforesaid; whereby the water content of said hydrosol is vaporized, expanding the drops to hollow spheroids and gelled in that form.

5. A process for the manufacture of hollow inorganic oxide gel spheroids which comprises forming a hydrosol of inorganic oxide including silica having the inherent properties of setting to a hydrogel without change in chemical composition after the lapse of a period of time and of passing through a viscous state just prior to gelation, injecting said viscous sol at a temperature in excess of its boiling point at the pressure existing in the medium hereinafter defined and during the said viscous state as a plurality of drops into a liquid medium maintained at a temperature in excess of said boiling point and at a pressure below the vapor pressure of said sol at the time of injection as aforesaid; whereby the water content of said hydrosol is vaporized, expending the drops to hollow spheroids and gelled in that form.

6. A process for the manufacture of hollow inorganic oxide gel spheroids which comprises forming a hydrosol of inorganic oxide including silica and alumina having the inherent properties of setting to a hydrogel without change in chemical composition after the lapse of a period of time and of passing through a viscous state just prior to gelation, injecting said viscous sol at a temperature in excess of its boiling point at the pressure existing in the medium hereinafter defined and during the said viscous state as a plurality of drops into a liquid medium maintained at a temperature in excess of said boiling point and at a pressure below the vapor pressure of said sol at the time of injection as aforesaid; whereby the water content of said hydrosol is vaporized, expanding the drops to hollow spheroids and gelled in that form.

7. A process for the manufacture of hollow inorganic oxide gel spheroids which comprises forming a hydrosol of inorganic oxide having the inherent properties of setting to a hydrogel without change in chemical composition after the lapse of a period of time and of passing through a viscous state just prior to gelation, injecting said viscous sol at a temperature in excess of its boiling point at the pressure existing in the medium hereinafter defined and during the said viscous state as a plurality of drops into a gaseous medium maintained at a temperature in excess of said boiling point and at a pressure below the vapor pressure of said sol at the time of injection as aforesaid; whereby the water content of said hydrosol is vaporized, expanding the drops to hollow spheroids and gelled in that form.

8. A process for the manufacture of hollow inorganic oxide gel spheroids which comprises forming a hydrosol of inorganic oxide including silica having the inherent properties of setting to a hydrogel without change in chemical composition after the lapse of a period of time and of passing through a viscous state just prior to gelation, injecting said viscous sol at a temperature in excess of its boiling point at the pressure existing in the medium hereinafter defined and during the said viscous state as a plurality of drops into a gaseous medium maintained at a temperature in excess of said boiling point and at a pressure below the vapor pressure of said sol at the time of injection as aforesaid; whereby the water content of said hydrosol is vaporized, expanding the drops to hollow spheroids and gelled in that form.

9. A process for the manufacture of hollow inorganic oxide gel spheroids which comprises forming a hydrosol of inorganic oxide including silica and alumina having the inherent properties of setting to a hydrogel without change in chemical composition after the lapse of a period of time and of passing through a viscous state just prior to gelation, injecting said viscous sol at a temperature in excess of its boiling point at the pressure existing in the medium hereinafter defined and during the said viscous state as a plurality of drops into a gaseous medium maintained at a temperature in excess of said boiling point and at a pressure below the vapor pressure of said sol at the time of injection as aforesaid; whereby the water content of said hydrosol is vaporized, expanding the drops to hollow spheroids and gelled in that form.

EDMUND L. SARGENT.

REFERENCES CITED

The following references are of record in the file of this patent:

UNITED STATES PATENTS

| Number | Name | Date |
| --- | --- | --- |
| 1,682,675 | Horsfield | Aug. 28, 1928 |
| 1,755,496 | Behrman | Apr. 22, 1930 |
| 2,093,454 | Kistler | Sept. 21, 1937 |
| 2,102,849 | Kokatnur | Dec. 21, 1937 |
| 2,340,194 | McMullen | Jan. 25, 1944 |
| 2,384,944 | Marisic | Sept. 18, 1945 |
| 2,384,945 | Marisic | Sept. 18, 1945 |
| 2,384,946 | Marisic | Sept. 18, 1945 |